April 25, 1944.    W. F. BOLDT    2,347,241
BRAKE CONTROL SYSTEM
Filed June 27, 1942    2 Sheets-Sheet 1

INVENTOR
W. F. BOLDT
BY
ATTORNEY

April 25, 1944.   W. F. BOLDT   2,347,241
BRAKE CONTROL SYSTEM
Filed June 27, 1942   2 Sheets-Sheet 2

INVENTOR
W. F. BOLDT
BY
ATTORNEY

Patented Apr. 25, 1944

2,347,241

UNITED STATES PATENT OFFICE 2,347,241

BRAKE CONTROL SYSTEM

Werner F. Boldt, Clayton, Mo., assignor to Wagner Electric Corporation, St. Louis, Mo., a corporation of Delaware Application June 27, 1942, Serial No. 448,763

16 Claims. (Cl. 180—18)

My invention relates to fluid pressure actuating systems and more particularly to such a system for controlling the brakes of a vehicle in an efficient and desirable manner.

One of the objects of my invention is to provide an improved fluid pressure brake actuating system for a vehicle which will permit the brakes to be so controlled that they can be employed under certain conditions to aid in steering.

A more specific object of my invention is to provide a fluid pressure braking system with improved valve means which can be controlled by the steering mechanism of the vehicle or by a manual control lever or by the condition of the change speed gearing so that the vehicle can be operated in an efficient manner.

Figure 1:
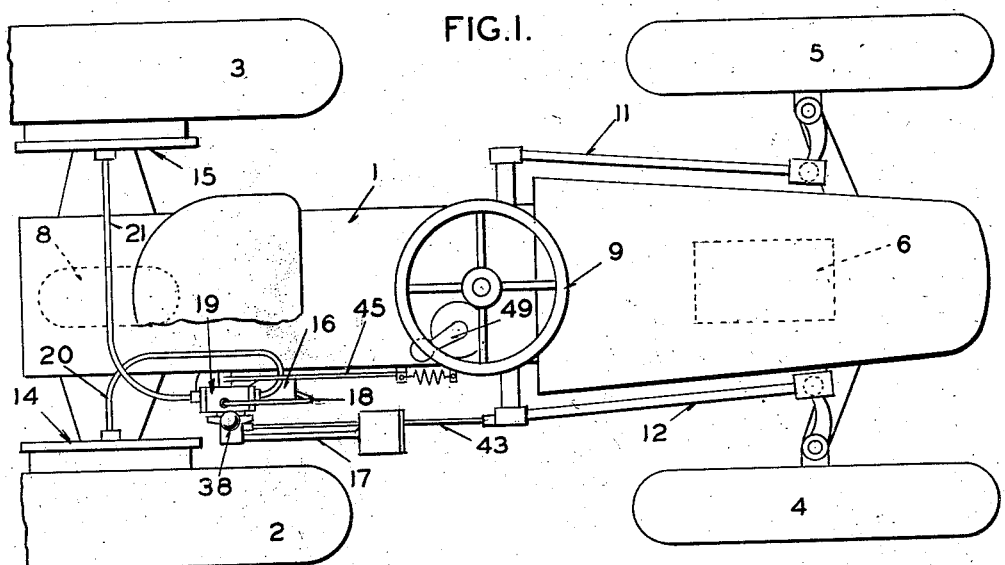
Figure 2:
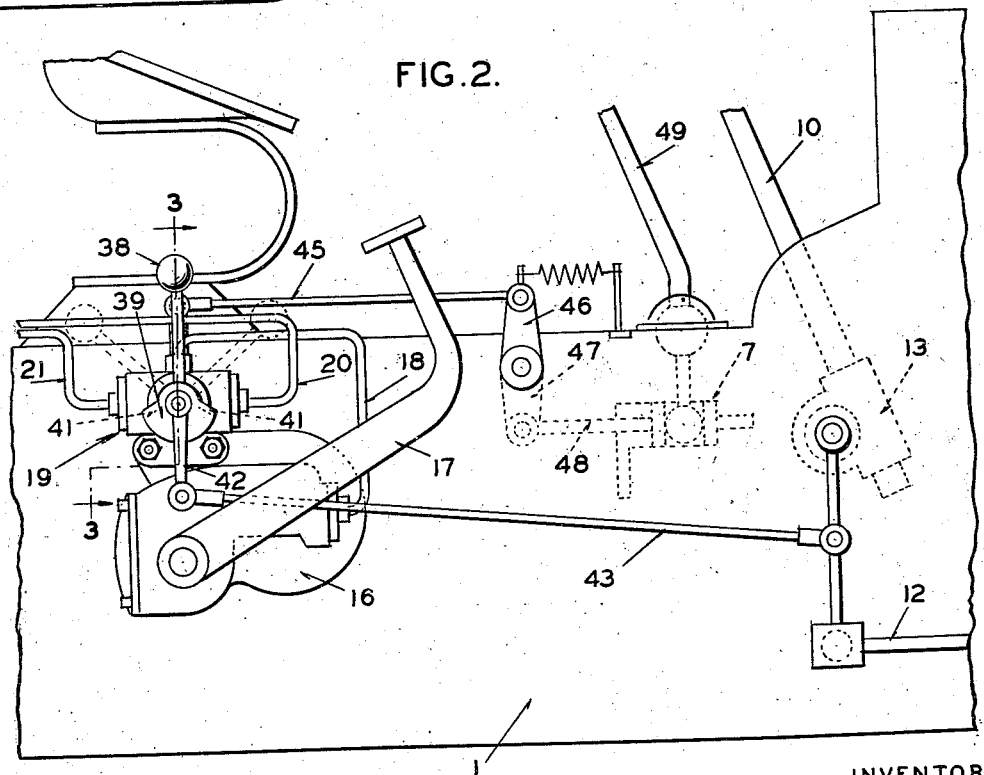
Figure 3:
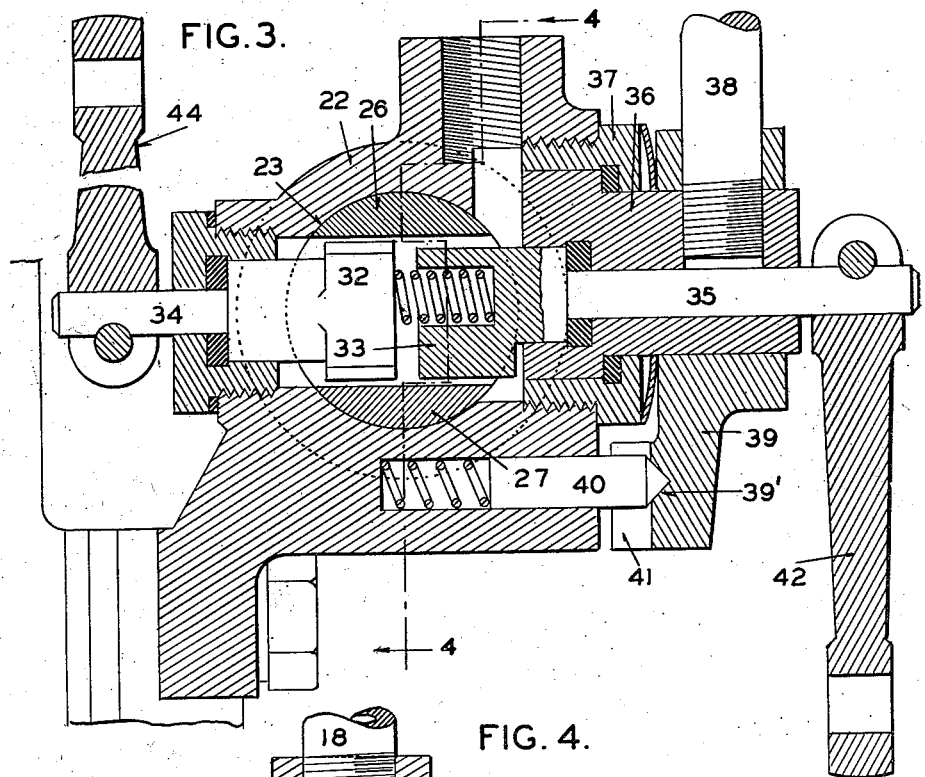

Other objects of my invention will become apparent from the following description taken in connection with the accompanying drawings in which Figure 1 is a top view of a vehicle provided with my improved braking system; Figure 2 is an enlarged side view of the control valve mechanism and associated parts; Figure 3 is a sectional view of the control valve mechanism, said view being taken on the line 3—3 of Figure 2; and Figure 4 is a sectional view taken on the line 4—4 of Figure 3.

Referring first to Figures 1 and 2, there is disclosed a tractor vehicle having a frame 1, right and left hand rear driving wheels 2 and 3 and right and left front dirigible wheels 4 and 5. The rear wheels are driven by the engine 6 through a change speed gearing 7 and differential gearing 8 in a well-known manner. The front wheels are steered by the usual mechanism comprising a steering wheel 9, a steering column 10 and connections 11 and 12 connected to the steering gear 13 at the bottom of the column.

The braking mechanism for the vehicle is shown as being of the hydraulic type and comprises brakes 14 and 15 on the right and left rear wheels, respectively, each brake being actuated by a fluid motor (not shown). The source of pressure for actuating the brakes comprises a master cylinder device 16 of known construction, the piston (not shown) of which is operated by a pedal 17. A conduit 18 leads from the outlet of the master cylinder to my improved control valve mechanism generally indicated by the numeral 19. From this valve mechanism a conduit 20 leads to the fluid motor of the right brake and a conduit 21 leads to the fluid motor of the left brake.

Figure 4:
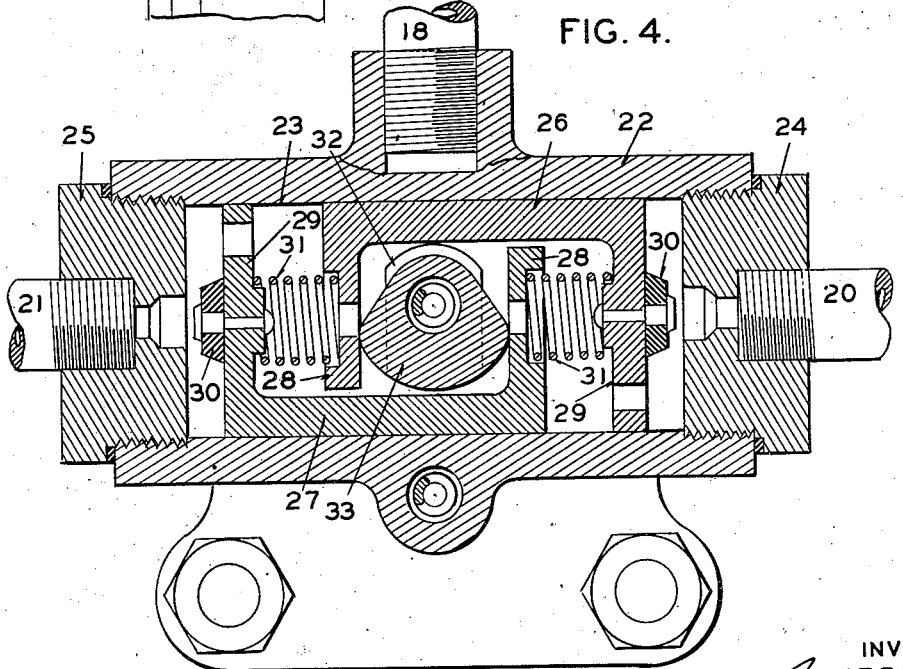

Referring to Figures 3 and 4, showing the details of the valve mechanism 19, the parts are enclosed in a casing 22 mounted on the top of the master cylinder device. This casing has a cylinder 23, one end of which is closed by a plug 24 to which is connected conduit 20 leading to the right brake and the other end is closed by a plug 25 to which is connected conduit 21 leading to the left brake. The central part of the cylinder communicates with conduit 18 leading from the master cylinder device. Slidably mounted within the cylinder are two valve carrying cages 26 and 27 of like U-shape with each having a leg 28 positioned between the legs of the other. Each of the other legs 29 carries valve elements 30, one of which cooperates with plug 24 to shut off conduit 20 from the cylinder and the other of which cooperates with plug 25 to shut off conduit 21. Springs 31 are positioned between the legs of the cages as shown.

Between the inner legs of the cages are positioned two cams 32 and 33, the former being generally rectangular in shape and the latter being generally triangular in shape. The cam 32 is formed on a shaft 34 which extends to one exterior side of casing 19 and cam 33 is formed on a shaft 35 which extends to the opposite exterior side of said casing. The cam 33, when in the position shown in Figure 4, is capable of holding both cages in a position so that the spring can cause either valve element 30 to be seated. However, if it is rotated in a clockwise direction from such position, the valve element 30 on cage 27 will be seated by a spring, thereby shutting off conduit 21 to the left wheel brake and, if rotated in a counter-clockwise direction, the valve element on cage 26 will be seated by a spring, thereby shutting off conduit 20 leading to the right wheel brake. The rectangular cam 32 will not interfere with this operation of the cages when it is in the position shown in Figure 4. However, if this cam 32 is rotated so as to engage the legs 28 of the cages, neither cage can be moved to seat the valve elements by a rotation of cam 33.

The shaft 35 carrying cam 33 is journaled eccentrically in a rotatable plug 36 mounted in a hollow nut 37 in the casing. The outer end of the plug is provided with an upstanding handle 38 for rotating it and also with a downwardly extending sector plate 39 for cooperation with a spring-biased plunger 40. The plate has a hole 39' for the reception of the plunger to thus maintain the plug in its neutral position corresponding to straight up position of the handle. Flanges 41 at the sides of the sector are provided for cooperation with the detent to limit the rotation of the plug in opposite directions from the straight up position of the lever. The outer end of shaft 35 has secured thereto a downwardly extending arm 42 which is connected by a rod 43 to the steering control connection 12 of the steering mechanism to thereby enable said shaft 35 to be controlled by the position of the steering mechanism. When the steering mechanism is in a position where the front wheels are straight ahead, shaft 35 will be in a position where cam 33 carried thereby is in the position shown in Figure 4 (both valve elements unseated). When the steering mechanism is operated to turn the front wheels sharply to the left to make a short left turn, cam 33 will be rotated counter-clockwise (as viewed in Figure 4), thereby shutting off conduit 20. When the steering mechanism is operated to turn the front wheels sharply to the right to make a short right turn, cam 33 will be rotated clockwise (as viewed in Figure 4), thereby shutting off conduit 21.

The outer end of shaft 34 carrying the rectangular cam 32 has secured thereto an upstanding lever 44 which is connected by a rod 45, levers 46 and 47 to the high gear range shifting rod 48 of the change speed gearing controlled by the gear shaft lever 49. By means of this connecting linkage, shaft 34 will be rotated to place cam 32 in a position where neither valve element 30 can be closed to shut off conduits 20 or 21 whenever the gearing is in the high speed range. In the other speed ranges, cam 32 will be in the position shown in Figure 4.

Referring now to the operation of the braking system, the parts of the control valve mechanism will be in the positions shown when the wheels of the vehicle are in straight ahead position and when the change speed gearing is in any of its lower speed ratios. This condition will prevail whether the vehicle is being driven or standing still. Under these conditions both valve elements 30 will be unseated and free two-way communication is possible between the master cylinder device and both brakes. Thus both brakes may be applied or released as desired.

If the wheels of the vehicle should be turned sharply to the right by the steering mechanism to make a short right hand turn, the cam 33 will be turned in a clockwise direction, as viewed in Figure 4, thus causing the valve cages to move to the left and thereby shut off conduit 21 leading to the left brake. If the master cylinder device should now be actuated, only the right brake will be applied, thus aiding in the steering of the vehicle sharply to the right. With only the right brake applied, the vehicle will pivot about the right wheel.

If the wheels should be turned sharply to the left by the steering mechanism to make a short left hand turn, then valve 33 will be turned in a counter-clockwise direction, as viewed in Figure 4, thereby resulting in the cages being so shifted as to shut off conduit 20 leading to the right hand brake. When the master cylinder device is actuated, only the left hand brake will be applied, thereby holding the left hand wheel and permitting the vehicle to pivot about this wheel. The arrangement is preferably such that when the steering mechanism controls the valve cages, conduits 20 and 21 will not be shut off until the wheels are turned approximately sixty or seventy per cent of their turning angle in either direction. Thus the steering mechanism cannot automatically shut off the brake unless it is desired to make a short turn.

When the change speed gearing is in a high speed ratio then the rectangular cam 32 will be so rotated that the valve elements carried by the cages will be held from shifting toward seated positions. This prevents the steering mechanism from having any control over the seating of the valve elements regardless of whether or not the wheels are turned sharply to make a short turn. By reason of this disabling of the automatic control of the valve when the gearing is in high speed ratio, there will be no danger of the operator applying only one brake when traveling at a high speed, as, for example, on a highway. If the valve mechanism were under the control of the steering mechanism when the vehicle is traveling at high speed, an accident could easily result if only one brake should be applied when a fairly short turn is made.

If the wheels of the vehicle should be in straight ahead position, then either valve may be controlled by the manual handle 38. If this handle should be swung to its extreme forward position, as viewed in Figure 2, then plug 36 will be given a clockwise rotation. Since shaft 35 is mounted eccentrically in this plug, the shaft will be shifted to the left as will also cam 33 thereof. This will result in both cages being shifted to the left, thus seating valve element 30 of cage 27 so as to shut off conduit 21 leading to the left hand brake. If the handle should be swung rearwardly, then both cages will be shifted to the right, thus seating valve element 30 of cage 36 and shutting off the right brake. Thus it is seen that with the wheels of the vehicle in straight ahead position, the operator can, nevertheless, selectively shut off either the right or the left hand brakes as desired. This may be found extremely desirable where one of the wheels is in soft ground and it is desired to brake that wheel only to assist in getting the vehicle onto firm ground.

If the handle should be in its forward position to disable the left brake and the wheels should be turned to the right, the conduit leading to the left brake will, nevertheless, continue to be shut off even through the wheels should not be turned to a short right hand turning position. However, if the wheels should be turned to the left when handle 38 is in said forward position, then rotation of cam 33 will move the cages so that valve element 30, which has been shutting off conduit 21, will be unseated, thereby causing both conduits 20 and 21 to be open so that both brakes can be applied. Similar conditions will prevail when the handle is in the rear position and the wheels are turned to the right by the steering mechanism from straight ahead position, that is, both valves will be open. It is thus seen that the manual control by the hand lever is effective to shut off either valve when the wheels are in straight ahead position or when the wheels are turned to shut off the valve of the brake on the side of the vehicle opposite the direction in which the vehicle is turned. When the wheels are turned, the handle cannot be employed to close the valve of the brake on the side corresponding to the direction of turning.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a vehicle provided with a steering mechanism and right and left driving members, brakes for the driving members, a fluid pressure brake actuating system including a source of pressure and a conduit means leading to each brake, a shut-off valve for each brake conduit for preventing fluid pressure from the source from actuating the brake, means comprising a rotatable cam for selectively closing the shut-off valves, means for rotating the cam so as to close one valve when the steering mechanism is turned in one direction and to close the other valve when the steering mechanism is turned in the other direction, and manual means for so controlling the cam that either shut-off valve can be selectively closed.

2. In a vehicle provided with a steering mechanism and right and left driving members, brakes for the driving members, a fluid pressure brake actuating system including a source of pressure and a conduit means leading to each brake, a shut-off valve for each brake conduit for preventing fluid pressure from the source from actuating the brake, means comprising a rotatable cam for selectively closing the shut-off valves, means for rotating the cam so as to close one valve when the steering mechanism is turned in one direction and to close the other valve when the steering mechanism is turned in the other direction, manual means for so controlling the cam that either shut-off valve can be selectively closed, and other manually-controlled means for preventing the cam from closing either shut-off valve.

3. In a vehicle provided with a steering mechanism, right and left driving members and a change speed gearing, brakes for the driving members, a fluid pressure brake actuating system including a source of pressure and a conduit means leading to each brake, a shut-off valve for each brake conduit for preventing fluid pressure from the source from actuating the brake, means comprising a rotatable cam for selectively closing the shut-off valves, means for rotating the cam so as to close one valve when the steering mechanism is turned in one direction and to close the other valve when the steering mechanism is turned in the other direction, manual means for so controlling the cam that either shut-off valve can be selectively closed, and means operable when the gearing is in a predetermined ratio for preventing the cam from causing the closing of either shut-off valve.

4. In a vehicle provided with a steering mechanism and right and left driving members, brakes for the driving members, a fluid pressure brake actuating system including a source of pressure and a conduit means leading to each brake, a casing forming part of the conduit means, aligned shut-off valve elements in the casing, each controlling a brake conduit for preventing fluid pressure from the source from actuating the brake, means comprising a single rotatable cam positioned in the casing between the valve elements and so operatively associated therewith as to selectively control the closing of the shut-off valves by rotation in opposite directions from neutral position, and means for rotating the cam from the exterior of the casing so as to close one valve when the steering mechanism is turned in one direction and to close the other valve when the steering mechanism is turned in the other direction.

5. In a vehicle provided with a steering mechanism and right and left driving members, brakes for the driving members, a fluid pressure brake actuating system including a source of pressure and a conduit means leading to each brake, a shut-off valve for each brake conduit for preventing fluid pressure from the source from actuating the brake, means for closing the valve of the conduit leading to the right brake when the steering mechanism is moved in a direction to make a short left turn and for closing the valve of the conduit leading to the left brake when the steering mechanism is moved to make a short right turn, and manually-controlled means for closing either valve when the steering mechanism is in straight ahead position of the vehicle or for closing one valve only regardless of any movement of said manually-controlled means if the steering mechanism is in a vehicle turning position, said one valve being that of the conduit leading to the brake on the side of the vehicle opposite the direction in which the vehicle is being turned.

6. In a vehicle provided with a steering mechanism and right and left driving members, brakes for the driving members, a fluid pressure brake actuating system including a source of pressure and a conduit means leading to each brake, a shut-off valve for each brake conduit for preventing fluid pressure from the source from actuating the brake, means for closing the valve of the conduit leading to the right brake when the steering mechanism is moved in a direction to make a short left turn and for closing the valve of the conduit leading to the left brake when the steering mechanism is moved to make a short right turn, manually-controlled means for closing either valve when the steering mechanism is in straight ahead position of the vehicle or for closing only one valve if the steering mechanism is in a vehicle turning position, said one valve being that of the conduit leading to the brake on the side of the vehicle opposite the direction in which the vehicle is being turned, and means for preventing either the steering mechanism or the manually-controlled means from closing either shut-off valve.

7. In a vehicle provided with a steering mechanism and right and left driving members, brakes for the driving members, a fluid pressure brake actuating system including a source of pressure and a conduit means leading to each brake, a shut-off valve for each brake conduit for preventing fluid pressure from the source from actuating the brake, means comprising a rotatable cam for selectively closing the shut-off valves, means for rotating the cam so as to close the valve of the conduit leading to the right brake when the steering mechanism is moved in a direction to make a short left turn and to close the valve of the conduit leading to the left brake when the steering mechanism is moved to make a short right turn, and manually-controlled means for bodily shifting said cam to close either valve when the steering mechanism is in the straight ahead position of the vehicle or to close only one valve if the steering mechanism is in a vehicle turning position, said one valve being that of the conduit leading to the brake on the side of the vehicle opposite the direction in which the vehicle is being turned.

8. In a vehicle provided with a steering mechanism, right and left driving members and a change speed gearing, brakes for the driving members, a fluid pressure brake actuating system including a source of pressure and a conduit means leading to each brake, a shut-off valve for each brake conduit for preventing fluid pressure from the source from actuating the brake, means for closing the valve of the conduit leading to the right brake when the steering mechanism is moved in a direction to make a short left turn and for closing the valve of the conduit leading to the left brake when the steering mechanism is moved to make a short right turn, manually-controlled means for closing either valve when the steering mechanism is in straight ahead position of the vehicle or to close only one valve if the steering mechanism is in a vehicle turning position, said one valve being that of the conduit leading to the brake on the side of the vehicle opposite the direction in which the vehicle is being turned, and means for preventing the closing of either valve when the gearing is in a predetermined gear ratio.

9. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam, and other means for selectively closing the shut-off valves independently of rotative movement of the cam.

10. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam, and other means for shifting the cam bodily in opposite directions to selectively close the shut-off valves.

11. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam including a shaft secured thereto, a rotatable member in which the shaft is eccentrically journaled, and means for rotating the rotatable member in opposite directions to bodily shift the cam and shaft and thereby selectively close the shut-off valves.

12. In a fluid pressure system, a valve mechanism for controlling the flow of fluid under pressure from a source to two conduits, said mechanism comprising a shut-off valve for each conduit, means for selectively closing the shut-off valves, and means separate from said first named means and operable independently of the first named means for preventing any closing of the shut-off valves by said first named means.

13. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam, and means operable independently of the cam for preventing the closing of the shut-off valves by the cam.

14. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam, a second rotatable cam for preventing the first cam from closing either shut-off valve, and means for rotating the second cam independently of the first cam.

15. In a fluid pressure system, a valve mechanism for controlling the flow of fluid under pressure from a source to two conduits, said mechanism comprising a shut-off valve for each conduit, a rotatable cam for selectively closing the shut-off valves, means for rotating the cam, means for bodily moving the cam independently of the rotating means to provide a second control for selectively closing the shut-off valves, a second rotatable cam for preventing the first cam from closing either shut-off valve, and means for rotating the second cam independently of the first cam.

16. In a fluid pressure system having a source of pressure and two fluid pressure actuated motors in communication therewith by conduits, valve means associated with the conduits for preventing fluid under pressure from being transmitted to the motors and comprising a casing provided with opposed valve seats, a movable valve element for cooperating with each seat, said valve elements being positioned in axial alignment, spring means for biasing said valve elements toward seated positions, a rotatable cam positioned between and engageable with parts of both valve elements to normally hold them unseated and so constructed and associated therewith that when rotated in one direction one valve element will be caused to be closed and when rotated in the opposite direction the other valve element will be closed, means for rotating said cam in opposite directions, and means operable independently of the cam for preventing either valve element from being closed notwithstanding rotation of the cam.

WERNER F. BOLDT.